G. P. FARMER.

BUTTON.

No. 10,340. Reissued June 12, 1883.

WITNESSES:

David Williams

Hamilton D. Turner

INVENTOR:

George P. Farmer, by his Attorneys,

Howson & Sons

UNITED STATES PATENT OFFICE.

GEORGE P. FARMER, OF MONTCLAIR, NEW JERSEY.

BUTTON.

SPECIFICATION forming part of Reissued Letters Patent No. 10,340, dated June 12, 1883.

Original No. 275,619, dated April 10, 1883. Application for reissue filed May 1, 1883.

*To all whom it may concern:*

Be it known that I, GEORGE P. FARMER, a citizen of the United States, and a resident of Montclair, New Jersey, have invented an Improvement in Buttons and in the Manufacture of the Same, of which the following is a specification.

My invention relates to that class of buttons in which the head is composed of two parts—namely, a recessed disk of one material and a center-piece of an ornamental substance; and the main object of my invention is to firmly secure a shank to the head of a button of this character—an object attained in the manner which I will now proceed to describe, reference being had to the accompanying drawings, in which—

Figure 1:
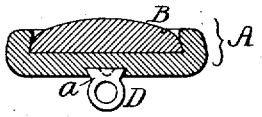
Figure 2:
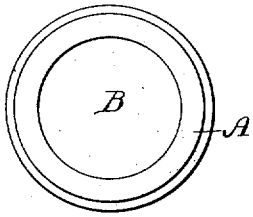
Figure 7:
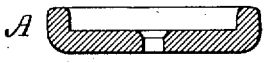
Figure 8:
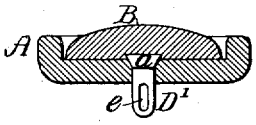
Figure 3:
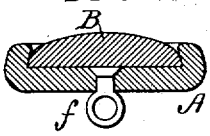
Figure 9:
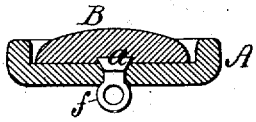
Figure 4:
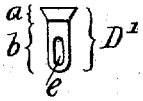

Figure 1 is a section, and Fig. 2 a plan view, of an ordinary button of the class to which my invention relates; Fig. 3, a section of my improved button; Fig. 4, a view of the shank as it appears before it is applied to the head of the button; and Figs. 5, 6, 7, 8, 9, and 10, views showing the mode of carrying out my invention.

Referring to Figs. 1 and 2, which represent an ordinary button of the class referred to, it will be seen that the head of the button is composed of two parts—namely, the flanged disk A and the center-piece B, the former being generally made of hard rubber, horn, bone, or other comparatively cheap material, and the center-piece being of ivory, pearl, or other more costly and ornamental substance. The shank consists of a metal eye, D, having a hollow projection, *a*, which is introduced into an undercut recess in the back of the disk A, the projection being subsequently expanded in the said recess by pressure or impact, so that it will be retained therein.

It should be stated that in buttons of this class the passing of the shank through both the disk and the center-piece is always avoided, as the said center-piece would be disfigured by the riveted end of the shank.

The objection to the ordinary plan described above of making buttons is the ready detachment of the head from the shank when the button is subjected to strains, the hold of the shank in the button being more or less insecure. The manner of avoiding this objection constitutes the main feature of my invention, and is illustrated in Figs. 3 and 4. The metal shank D′, Fig. 4, is made with a beveled head, *a*, which may be solid, and with a straight shank, *b*, through which extends an elongated slot, *e*. Before the center-piece B is fitted to the flanged disk, the straight stem of the shank is passed through a central hole in the said disk, this hole being countersunk or recessed to receive the head of the shank. After this the slotted portion of the disk is expanded by a suitable instrument and formed into the eye *f*, Fig. 3, and the shank is thus firmly secured to the disk, to which the center-piece is afterward fitted.

Figure 5:
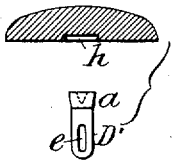
Figure 6:
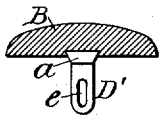

While the main objection to ordinary buttons of this class is overcome in the manner described, I prefer to avail myself of this feature of my invention to overcome another objection. The center-pieces of ordinary buttons are generally retained in their places in the disk by shrinking the flange of the latter to the edge of the center-piece; but the disks are often made of such material that when the buttons are exposed to different temperatures the center-pieces frequently become detached. In order to prevent this I make in the under side of the center-piece an undercut recess, *h*, as shown in Fig. 5, for receiving a portion of the head of the shank, for which purpose the head is made thicker than in Fig. 4. A portion of the head of the shank is introduced into the said recess and expanded therein, so as to retain a hold of the center-piece, as shown in Fig. 6. The shank is then passed through the central hole of the disk A, Fig. 7, and the center-piece at the same time fitted to its place in the recess of the disk, the portion of the head of the shank which is not contained in the undercut recess of the center-piece fitting in the countersink in the disk, Fig. 8. After this the slotted portion of the stem of the shank is expanded into an eye, as before, Fig. 9, and the three parts of the button are thus firmly connected together, the center-piece relying for its retention in the recess of the disk on the hold which a portion of the shank has on the said center-piece.

Figure 10:
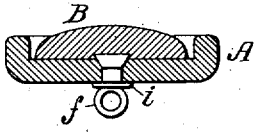

A metal washer, *i*, Fig. 10, may be advantageously used between the disk and the eye, the washer being passed over the slotted portion of the stem before it has been expanded to form the eye *f*.

I claim as my invention—

1. The mode herein described of securing a shank to a button-head composed of a disk, A, and center-piece B, the said mode consisting in first making a slot in the stem of the headed shank, then passing the same through a central opening in the disk A of the button-head, and finally expanding the said slotted portion of the stem to form an eye, all substantially as set forth.

2. The combination of the disk and center-piece of a button-head with a shank having a head partly contained and retained in a recess in the center-piece and partly in a recess or countersink in the disk, and having an eye, *f*, all substantially as described.

In testimony whereof I have signed my name to this specification in the presence of two subscribing witnesses.

GEORGE P. FARMER.

Witnesses:
WM. F. LETT,
ANDW. C. SHARP.